US012665829B2

(12) United States Patent　　　　　(10) Patent No.:　US 12,665,829 B2
Rachamadugu et al.　　　　　　　　　(45) Date of Patent:　Jun. 23, 2026

(54) GO AND STOP PROTOCOL FOR SYNCHRONIZED WIRELESS RECEIVER

(71) Applicant: Silicon Laboratories Inc., Austin, TX (US)

(72) Inventors: Jitesh Rachamadugu, Hyderabad (IN); Suresh Babu Sykam, Hyderabad (IN); Sandeep Voruganti, Hyderabad (IN); Rakesh Bandari, Hyderabad (IN); Niranjan Kumar Jonnada, Hyderabad (IN); Ayan Ghosh, Hyderabad (IN)

(73) Assignee: Silicon Laboratories Inc., Austin, TX (US)

( * ) Notice: Subject to any disclaimer, the term of this patent is extended or adjusted under 35 U.S.C. 154(b) by 127 days.

(21) Appl. No.: 18/497,159

(22) Filed: Oct. 30, 2023

(65) Prior Publication Data

US 2025/0141772 A1　　May 1, 2025

(51) Int. Cl.
H04L 43/087　　(2022.01)
H04L 43/026　　(2022.01)
(52) U.S. Cl.
CPC .......... H04L 43/087 (2013.01); H04L 43/026 (2013.01)
(58) Field of Classification Search
CPC ............................ H04L 43/087; H04L 43/026
See application file for complete search history.

(56) References Cited

U.S. PATENT DOCUMENTS

| | | | | |
|---|---|---|---|---|
| 2015/0295982 | A1* | 10/2015 | Kafle | H04L 69/40 |
| | | | | 709/219 |
| 2016/0277522 | A1* | 9/2016 | Singh | H04W 4/80 |
| 2020/0275311 | A1* | 8/2020 | Zhao | H04W 28/06 |
| 2021/0337005 | A1* | 10/2021 | Aggarwal | H04N 21/44227 |
| 2023/0397280 | A1* | 12/2023 | Li | H04W 12/122 |
| 2025/0110690 | A1* | 4/2025 | Bates | G06F 3/167 |

OTHER PUBLICATIONS

Bluetooth SIG Proprietary, "Advanced Audio Distribution Profile," Bluetooth Profile Specification, Rev. 1.4, Jun. 21, 2022, 73 pgs.
Silicon Laboratories Inc., AN986: Bluetooth A2DP and AVRCP Profiles, Getting Started Guide, Rev. 2.2, Mar. 18, 2019, 50 pgs.
Bluetooth SIG Proprietary, "Bluetooth Core Specification," Bluetooth Specification, Rev. 5.4, Jan. 31, 2023, pp. 1-82, 470-494.

* cited by examiner

*Primary Examiner* — Farzana B Huq
(74) *Attorney, Agent, or Firm* — Trop, Pruner & Hu, P.C.

(57)　　　　　　ABSTRACT
In one embodiment, a method includes: receiving, in a sink device, profile information regarding a communication from a source device; based at least in part on the profile information, determining, in the sink device, a size for a buffer of the sink device, the buffer for storing streaming data of the communication; based at least in part on the profile information, determining, in the sink device, a synchronization interval for the communication; and controlling, via the sink device, the communication of the streaming data from the source device to the sink device via a first wireless protocol based at least in part on the synchronization interval, to cause the sink device to be a synchronized receiver for the communication.

19 Claims, 4 Drawing Sheets

GO AND STOP PROTOCOL FOR SYNCHRONIZED WIRELESS RECEIVER

BACKGROUND

In Bluetooth wireless communications, streaming data can be sent according to an Advanced Audio Distribution Profile (A2DP), which describes how stereo-quality audio can be streamed from a media source to a sink. The profile defines two roles of an audio device: as a source (originator of a digital audio stream) and a sink (recipient of the audio stream).

Such communications can occur in a wireless personal area network (PAN), referred to as a Piconet in the context of Bluetooth. In a Piconet, a collection of devices occupies a shared physical channel, and one of the devices is the Piconet Central and the remaining devices connect to it.

Typically, a sink device will continuously listen for packets since it does not have information when the central will start data transfer. This arrangement restricts availability of a multi-role scenario like A2DP Streaming Plus Bluetooth Low Energy (BLE) Sensor Connections, where a sink can also be in communication with one or more other devices such as sensors. If the sink only intermittently listens for streaming data, there can be a significant increase of retransmissions on the central side. For example, with a 50 percent listen time on a sink, retransmissions of around 50 percent can occur on the source. In addition, scheduling challenges arise as a number of the BLE sensor connections increases, and unnecessary bandwidth is wasted.

SUMMARY OF INVENTION

In one aspect, a method includes: receiving, in a sink device, profile information regarding a communication from a source device; based at least in part on the profile information, determining, in the sink device, a size for a buffer of the sink device, the buffer for storing streaming data of the communication; based at least in part on the profile information, determining, in the sink device, a synchronization interval for the communication; and controlling, via the sink device, the communication of the streaming data from the source device to the sink device via a first wireless protocol based at least in part on the synchronization interval, to cause the sink device to be a synchronized receiver for the communication.

In an embodiment, the method further comprises: storing at least a portion of the streaming data in the buffer; and in response to a level of the buffer exceeding a first threshold, sending a message to the source device to cause the source device to pause sending the streaming data. The method may further comprise in response to the level of the buffer being below a second threshold, sending a second message to the source device to cause the source device to resume sending the streaming data, the second threshold lower than the first threshold. The method also may include sending the message comprising a zero length packet, the zero length packet comprising a flow indicator having a first value to indicate a stop request to cause the source device to pause sending the streaming data.

In an embodiment, the method further comprises sending the second message comprising a second zero length packet, the second zero length packet comprising a flow indicator having a second value to indicate a start request to cause the source device to resume sending the streaming data. The method may also include: after sending the message, receiving sensor data from at least one sensor coupled to the sink device via the first wireless protocol; and at a beginning of a next synchronization interval, sending the second message to the source device to cause the source device to resume sending the streaming data.

In an embodiment, the method further comprise monitoring the level of the buffer via an advanced audio distribution profile (A2DP) state machine associated with the buffer. The method also may include generating the message in the A2DP state machine, the message comprising a Bluetooth zero length packet having a flow indicator with a first value comprising a stop request.

In an embodiment, the method further comprises communicating with at least one sensor via a Bluetooth channel concurrently with receiving the streaming data from the source device via the Bluetooth channel. The method also may include: in response to a level of the buffer exceeding a first threshold, sending a message to the source device to cause the source device to pause sending the streaming data; determining if connection data for at least one sensor is present; and in response to the connection data being present, communicating with the at least one sensor. The method may further comprise: in response to the level of the buffer being below a second threshold, the second threshold lower than the first threshold, halting communicating with the at least one sensor; and sending a second message to the source device to cause the source device to resume sending the streaming data.

In an embodiment, the method further comprises receiving the streaming data in the sink device as a plurality of portions, wherein the plurality of portions comprises at least some original transmissions and at least one retransmission, the at least one retransmission less than approximately 10% of the at least some original transmissions.

In another aspect, an apparatus includes: a multi-protocol wireless transceiver to transmit and receive radio frequency (RF) signals of at least a first wireless protocol and a second wireless protocol; a memory to store a buffer, the buffer to store an audio stream from a source device; and a processor coupled to the memory, the processor comprising an A2DP circuit to monitor a level of the buffer and to initiate a stop request when the level of buffer exceeds a first threshold, the processor to cause the multi-protocol wireless transceiver to send to the source device a first RF signal of the first wireless protocol comprising a zero length packet comprising the stop request and thereafter to stop listening to the source device for at least a remainder of a synchronization interval.

In an embodiment, the processor is to: during the remainder of the synchronization interval, determine whether a sensor has data to send; and if so, cause the multi-protocol wireless transceiver to receive and process second RF signals comprising the data from the sensor for at least the remainder of the synchronization interval, the synchronization interval based at least in part on profile information associated with the audio stream. The processor, after the remainder of the synchronization interval and when the level of the buffer is below a second threshold lower than the first threshold, may be configured to send to the multi-protocol wireless transceiver a second zero length packet comprising a start request, the multi-protocol wireless transceiver to send to the source device a second RF signal of the first wireless protocol comprising the start request to cause the source device to send at least one more portion of the audio stream.

In yet another aspect, a device comprises: at least one antenna to transmit and receive RF signals of a plurality of protocols; at least one sensor; at least one transceiver to process and communicate the RF signals of the plurality of protocols via the at least one antenna; a memory to store a buffer, the buffer to store streaming data from a source device; and a processor coupled to the memory to monitor a level of the buffer and to determine a synchronization interval for communication of the streaming data based at least in part on a size of the buffer and profile information associated with the streaming data, the processor, when a level of the buffer exceeds a first threshold, to generate a first zero length packet comprising a header including a flow indicator having a first value to indicate a stop request to cause the source device to pause the communication of the streaming data.

In an embodiment, the device comprises a smartwatch, the at least one sensor comprising one or more of a GPS sensor, an accelerometer, and a heart rate sensor. The at least one transceiver may send a first RF signal of a first protocol of the plurality of protocols to the source device, the first RF signal comprising the first zero length packet. After the first RF signal of the first protocol is sent, the processor may cause the at least one transceiver to communicate with the at least one sensor. At a next synchronization interval following the communication with the at least one sensor, the processor may cause the at least one transceiver to receive an additional portion of the streaming data from the source device.

DETAILED DESCRIPTION

Figure 1:
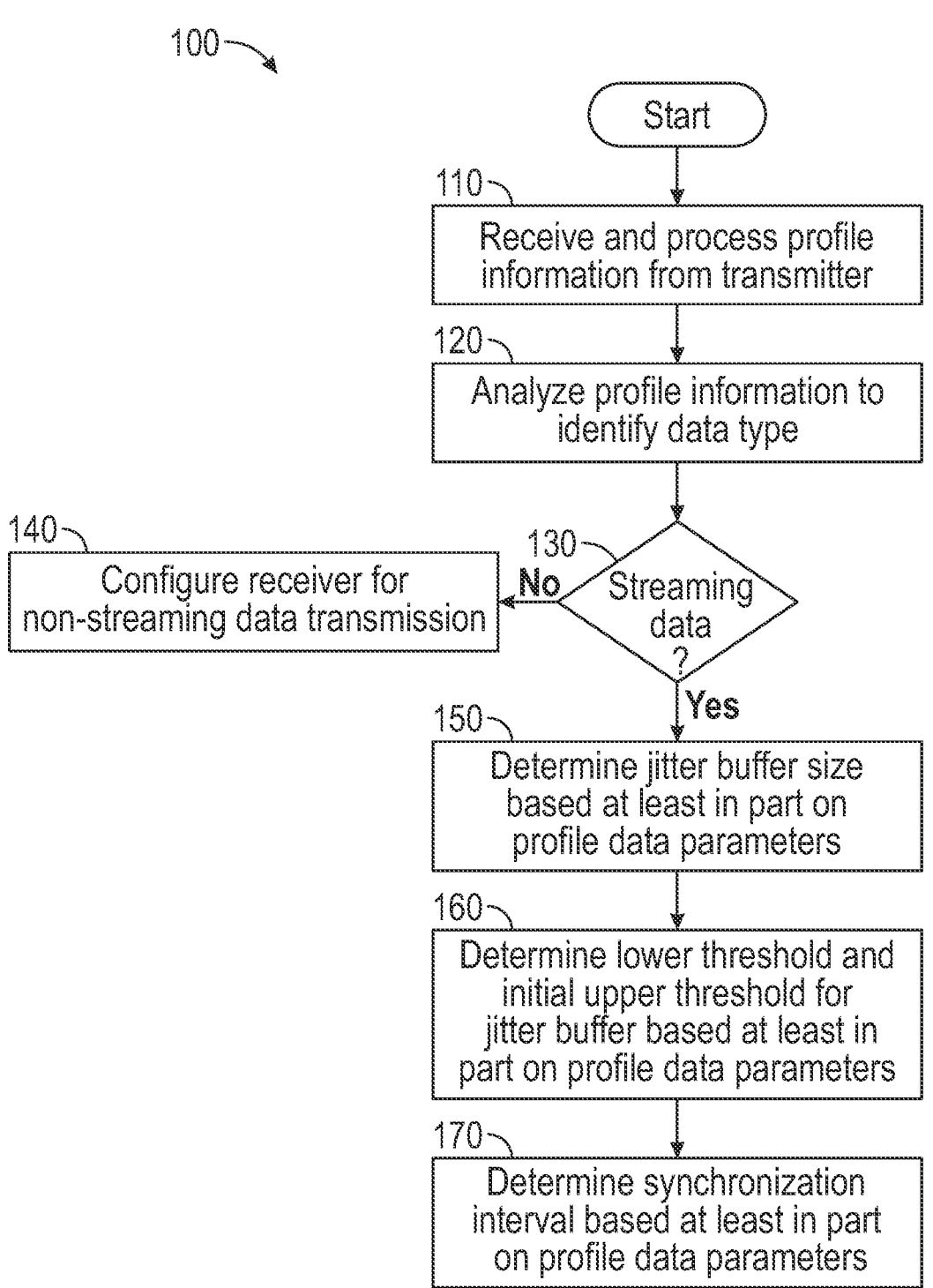
FIG. 1 is a flow diagram of a method in accordance with an embodiment.

In various embodiments, streaming information communicated between a source device and a sink device can be managed to reduce an amount of retransmissions of portions of the streaming data. More particularly, a receiving sink device can be configured to monitor profile data communicated between source and sink devices to determine a nature of data that is to be communicated.

When it is determined that the data is streaming data, the sink device may, based at least in part on various parameters of the profile data as well as potentially other information such as presence of additional devices and their data communications, determine an appropriate synchronization interval at which the streaming data is to be communicated. In addition, the sink device may configure a buffer into which the streaming data is to be stored. This configuration may include appropriately sizing the buffer to be able to store at least several packets worth of streaming data and further to configure appropriate upper and lower thresholds for the buffer. These thresholds may be used in managing the data communication as will be described herein.

With this arrangement, the sink device may be configured as a synchronized receiver. Stated another way, the streaming data communication between source device and sink device may be according to a synchronization interval at which the streaming data is sent, to ensure that streaming data is available for processing, yet does not overwhelm resources of the sink device including the buffer. As a result, retransmissions are reduced.

Once configured in this manner, the sink device may receive incoming streaming data and the store it into the configured buffer. Such operation may proceed until the sink device identifies that an amount of received streaming data exceeds a given threshold level, e.g., as determined based on a buffer level of the buffer. On occurrence of this condition of the streaming data exceeding the threshold level, the sink device can send a message to the source device requesting that the streaming data transmission be paused. After a given amount of time or occurrence of another event (such as the level of the buffer falling below a threshold level), the sink device can send another message to the source device requesting that additional streaming data be communicated during one or more synchronization intervals. Note that the operations described herein to determine an appropriate synchronization interval and buffer size, as well as the concomitant managing of the data transmission, may be performed by upper layers of the communication protocol.

In one implementation, wireless data communication may be according to a given Bluetooth protocol such as a Bluetooth Low Energy (BLE) protocol. The streaming data in an embodiment may be A2DP data. In such an implementation, an existing message format can be used to send the stop and start messages in an efficient manner.

Since an audio data stream is periodic in nature, a processor can estimate how periodically data is to be received. From this estimation, a size of a buffer (referred to herein as a "jitter buffer") can be determined and configured. Once configured, incoming streaming audio data may be stored in this jitter buffer, to avoid audio chops in case of retransmissions. Once the jitter buffer is filled (e.g., reaches an upper threshold), the sink device can request the source device to stop sending the streaming audio data. Although embodiments are not limited in this regard, as one example the sink device can send a Bluetooth zero length packet with a flow indicator (which may be present in a packet header) having a first value configured to act as a stop indicator.

The source device, in response to this stop request, may be configured to pause sending of the streaming audio data. The sink device also can be configured to later send another request to the source device to begin transmitting the streaming audio data again. Depending on implementation, this request may be sent after a predetermined time interval has occurred (e.g., at least one synchronization interval) and/or after a level of the jitter buffer has fallen below a second (lower) threshold. For example, the sink device can send another Bluetooth zero length packet with a flow indicator having a second value configured to act as a start indicator. The source device, in response to this start request, may be configured to resume sending of the streaming audio data. These two zero length packets may be the basis of a go and stop protocol in which the sink device can control stopping and restarting of streaming data communication from a source device (i.e., a peripheral device causing control of a central device streaming operation).

Referring now to FIG. 1, shown is a flow diagram of a method in accordance with an embodiment. More specifically as shown in FIG. 1, method 100 is a method for configuring a sink device, namely a wireless device such as an Internet of Things (IoT) device, to be a synchronized receiver with respect to a corresponding transmitter with which it may be synchronized for handling streaming data communication. Method 100 may be performed by hardware circuitry of the sink device, such as a wireless processor alone and/or in combination with firmware and/or software.

As illustrated, method 100 begins by receiving and processing profile information from the transmitter (block 110). This profile information may include various configuration information regarding an upcoming data communication. For example, the profile information may inform the receiver regarding the type of data, communication rate, bit pool length and so forth. With regard to streaming audio data, the profile information may include information to identify the stream as an audio stream, whether it is stereo or mono data, a sampling frequency, bit pool lengths, codec type and so forth.

Next at block 120 this profile information may be analyzed to identify data type. Based on this analysis it is determined at diamond 130 whether the data is streaming data. If not, at block 140 the receiver is configured for receiving and processing incoming non-streaming data.

Otherwise when it is determined that incoming data is streaming data, control passes to block 150 where a jitter buffer size may be determined based at least in part on the profile information. Although embodiments are not limited in this regard, the jitter buffer may be sized to accommodate storage of at least several packets of streaming data. For example for streaming stereo audio data, the jitter buffer may be sized to accommodate between at least approximately 60 and 120 milliseconds of data to accommodate between, e.g., 3 and 6 packets. Next at block 160, thresholds can be determined for the buffer, which may be based at least in part on the provided profile data parameters (e.g., packet size for the streaming data). In an embodiment, upper and lower thresholds may be configured with the upper threshold set to approximately 80% of the buffer size and the lower threshold set to approximately 20% of the buffer size.

Finally at block 170, a synchronization interval may be determined based at least in part on the profile information. As described herein, this synchronization interval may be set for a duration that is based at least in part on a size of the jitter buffer and the packet size of incoming streaming data, as well as possible other information such as the nature of other data communications (such as BLE data from on or more sensors). At this point, the sink device is appropriately configured as a synchronized receiver to receive incoming streaming data from a transmitter according to the determined synchronization interval.

Figure 2:
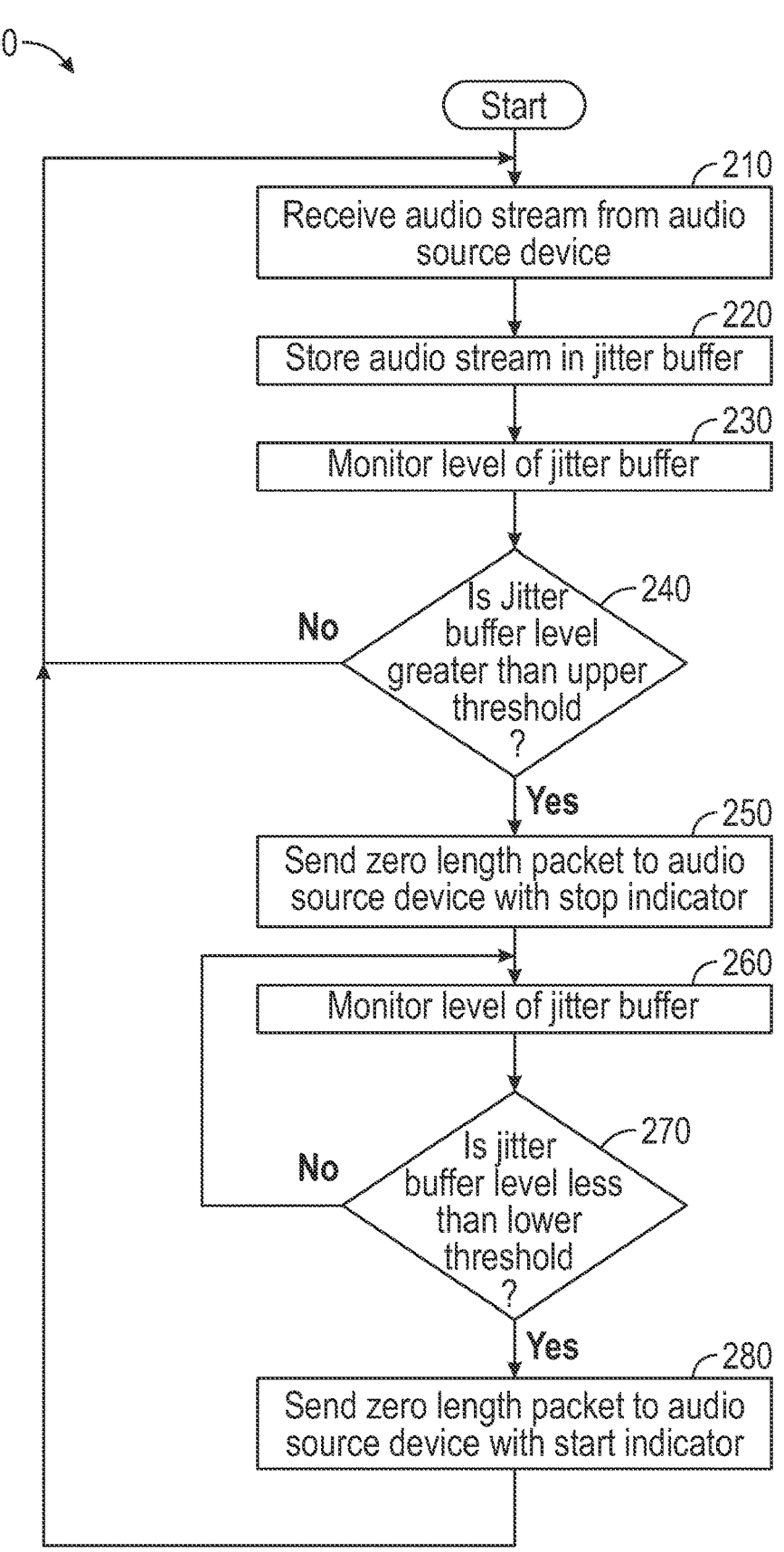
FIG. 2 is a flow diagram of a method in accordance with another embodiment.

Referring now to FIG. 2, shown is a flow diagram of a method in accordance with another embodiment. More specifically as shown in FIG. 2, method 200 is a method for performing data communications between a source device and a sink device, namely a wireless device such as an IoT device that is a synchronized receiver with respect to the source device by way of the techniques described herein. Method 200 may be performed by hardware circuitry of the sink device, such as a wireless processor alone and/or in combination with firmware and/or software.

As shown in FIG. 2, method 200 begins by receiving an audio stream from an audio source device (block 210). The sink device, via a transceiver, receives and processes a radio frequency (RF) signal containing packets of the audio stream, and stores the audio stream in the jitter buffer (block 220). As part of this operation, the level of the jitter buffer is monitored (block 230). In an embodiment an A2DP engine is configured to monitor this jitter buffer level.

Still referring to FIG. 2, next it is determined whether the jitter buffer level exceeds an upper threshold (diamond 240). If not, control passes back to block 210 where further streaming data may be received and stored as discussed above.

Instead when it is determined at diamond 240 that the jitter buffer level exceeds the upper threshold, control passes to block 250 where a zero length packet is sent to the audio source device. More specifically, this zero length packet may include a stop indicator, e.g., a flow bit having a set value (e.g., 1) to indicate that the source device is to stop sending the streaming data. Thus at this point within a synchronization interval, streaming data communication halts, and the sink device may listen (via control of the transceiver) to determine presence of sensor data.

That is, although not shown in FIG. 2, understand that during a synchronization interval and following sending the zero length packet, communications may occur with one or more different devices (e.g., sensors). More specifically, the AD2P engine may cause the transceiver to listen for packets from one or more sensors during a remaining portion of a synchronization interval in which streaming data is not sent from the source device in response to the stop indicator. Understand that during this inactive portion of the synchronization interval, the transceiver can communicate with such sensors having data to send.

Still referring to FIG. 2, control next passes to diamond 260 where the jitter buffer level is monitored. When it is determined at diamond 270 that the jitter buffer level is lower than a lower threshold, control passes to block 280. At block 280 another zero length packet is sent to the source device. This zero length packet is sent with a start indicator, e.g., a flow bit having a reset value (e.g., 0) to cause the source device to begin again sending the audio stream. Thus with the arrangement in FIG. 2, the sink device acts as a synchronized receiver with respect to the source device, receiving packets according to a synchronization interval. As a result, streaming communications can occur with fewer retransmissions and providing available windows in which data communication can occur with other devices.

Figure 3:
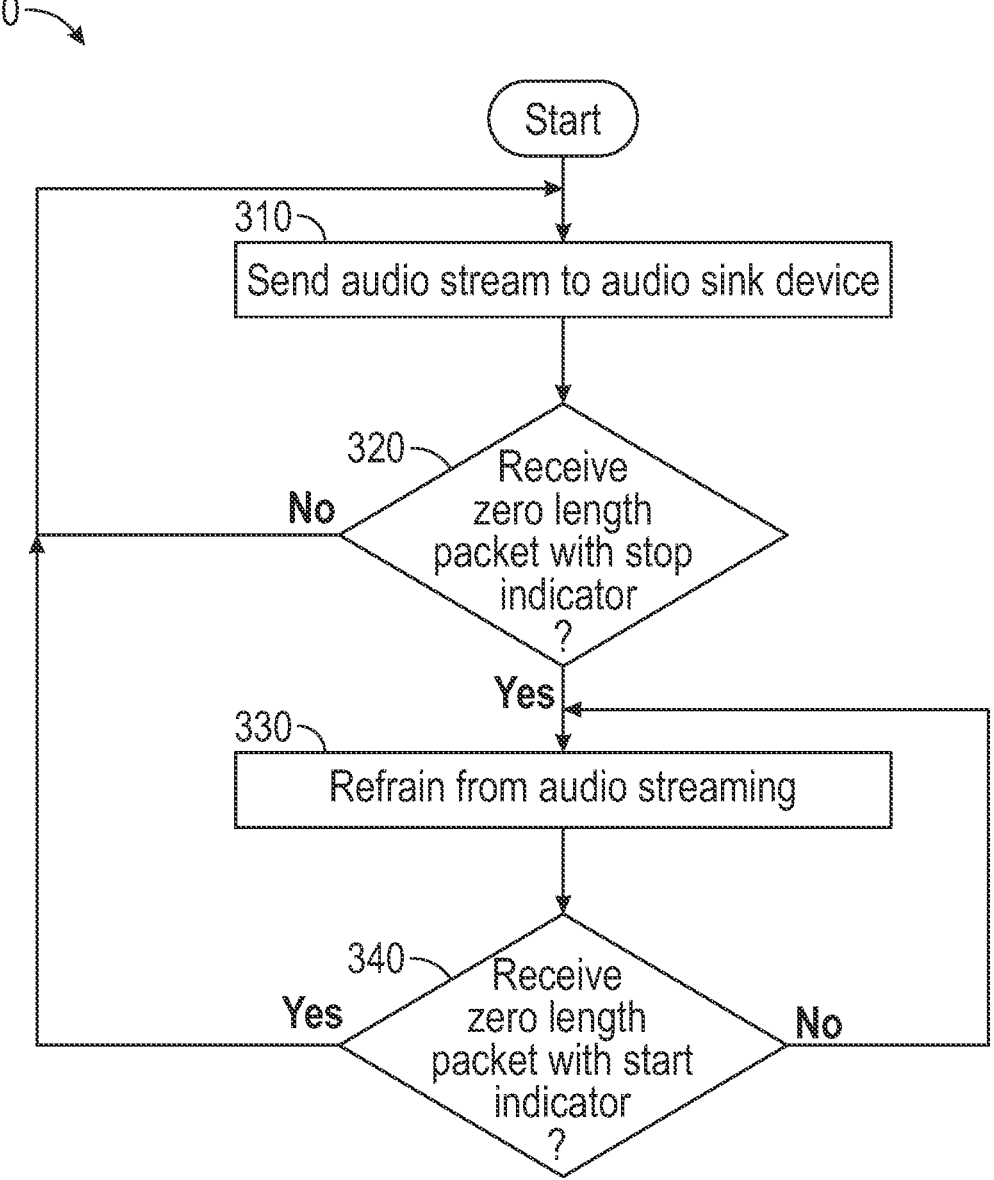
FIG. 3 is a flow diagram of a method in accordance with yet another embodiment.

Referring now to FIG. 3, shown is a flow diagram of a method in accordance with yet another embodiment. More specifically as shown in FIG. 3, method 300 is a method for performing data communications between a source device and a sink device, from the point of view of the source device, which may be a wireless device such as a smartphone or other wireless-enabled device. Method 300 may be performed by hardware circuitry of the source device, such as a wireless processor alone and/or in combination with firmware and/or software. As shown in FIG. 3, method 300 begins by sending an audio stream to an audio sink device (block 310). Next at diamond 320 it is determined whether a zero length packet with a stop indicator is received. If not, additional portions of the audio stream can be sent, with control passing back to block 310.

Instead when it is determined that a zero length packet with a stop indicator has been received, control passes to block 330 where the source device is refrained from sending further audio streaming data. After stopping the sending of the audio stream, control passes to diamond 340 to determine whether a zero length packet having a start indicator has been received. If not, control passes back to block 330 where no further streaming data is sent. Otherwise on receipt of a zero length packet with a start indicator, control passes back to block 310 where additional portions of the audio stream can be sent. Although shown at this high level in the embodiment of FIG. 3, many variations and alternatives are possible.

Figure 4:
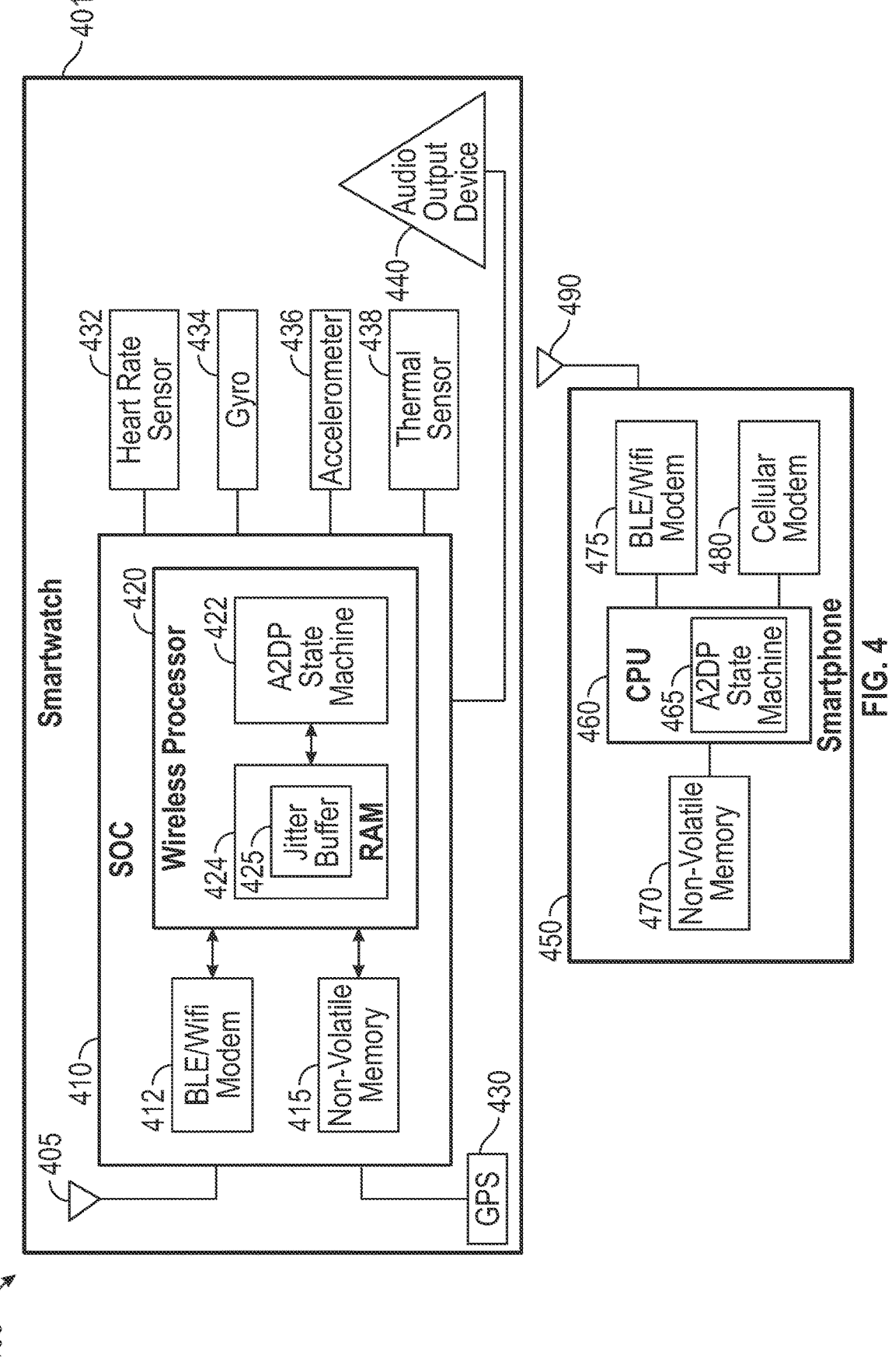
FIG. 4 is a block diagram of a wireless environment in accordance with an embodiment.

Referring now to FIG. 4, shown is a block diagram of a wireless environment in accordance with an embodiment. As shown in FIG. 4, wireless environment 400 includes a first device 401. In the embodiment of FIG. 4 first device

401 is a smartwatch that wirelessly couples to a smartphone 450. Of course, in other cases first device 401 may be another type of IoT or other wireless device.

Regarding smartwatch 401, multi-protocol communications wireless communications may occur via an antenna 405 that couples to a system on chip (SoC) 410. As seen, SoC 410 includes a modem 412 which may be configured for multiple protocols, including at least a BLE protocol and a Wi-Fi protocol. Modem 410 may include RF circuitry to receive and process incoming RF signals into baseband digital signals that are provided to a wireless processor 420.

In the high level shown in FIG. 4, wireless processor 420 includes an A2DP state machine 422. In embodiments, state machine 422 may be configured to identify streaming communications and configure a jitter buffer 425 (including its size and upper and lower thresholds), which may be present in a memory 424 (shown as a random access memory (RAM)). In addition, state machine 422 may be configured to determine a synchronization interval. As discussed, these configuration and determinations and configuration of jitter buffer 425 may be based at least in part on profile information. As further shown, SoC 410 includes a non-volatile memory 415. Non-volatile memory 415 may be implemented as a flash or other non-transitory storage medium that includes instructions including firmware and/or software. In an embodiment, such firmware may include instructions for execution by state machine 422.

Still with reference to FIG. 4, various sensors may couple to SoC 410. These sensors include a GPS sensor 430, heart rate sensor 432, a gyroscope 434, an accelerator 436 and a thermal sensor 438. In addition, smartwatch 401 also includes an audio output device 440. With embodiments herein, streaming communications such as audio information from smartphone 450 may be received with fewer retransmissions and with lower power consumption, enabling concurrent streaming communication along with sensor data from one or more of the above-discussed sensors.

Still referring to FIG. 4, in the high level shown, smartphone 450 includes an antenna 490 that couples to a multiprotocol modem 475. In addition, a cellular modem 480 is present. However in other implementations a single multiprotocol modem may handle multiple protocols including both Wi-Fi and cellular communications, along with Bluetooth or other protocols. As seen, modems 475, 480 coupled to a central processing unit (CPU) 460 which includes an A2DP state machine 465. In embodiments, state machine 465 may be similarly configured to state machine 422, and may handle both transmission and reception of streaming communications, which in the receive direction may be stored in a jitter buffer (not shown in FIG. 4 for ease of illustration). In the embodiment of FIG. 4, the jitter buffer may be stored in a non-volatile memory 470.

With embodiments, retransmissions from the master side can be reduced. For example, without an embodiment an A2DP audio data stream may have a retransmission rate of up to 40%, meaning that 40% of the data sent is retransmitted data. In contrast, with an embodiment the retransmission rate may be lower than approximately 10%, and can be even less than 5%. Such reduced retransmissions can reduce power consumption and further open up bandwidth for other communications, in addition to easing scheduling of A2DP audio transmissions. Embodiments may result in significant power optimization on the source (central) side. In addition, listening time on the sink (peripheral) side can be reduced from 100 percent to approximately 40 percent time, allowing concurrent communication with other wireless devices (such as one or more sensors), without any audio degradation. In this way an A2DP sink device can be implemented as a synchronized receiver.

What is claimed is:

1. A method comprising:
receiving, in a sink device, profile information regarding a communication from a source device;
based at least in part on the profile information, determining, in the sink device, a size for a buffer of the sink device, the buffer for storing streaming data of the communication;
based at least in part on the profile information, determining, in the sink device, a synchronization interval for the communication, the synchronization interval including an active portion for the communication of the streaming data and an inactive portion for communication between the sink device and one or more other devices;
controlling, via the sink device, the communication of the streaming data from the source device to the sink device via a first wireless protocol based at least in part on the synchronization interval, to cause the sink device to be a synchronized receiver for the communication;
in response to a level of the buffer exceeding a first threshold, sending a first message to the source device to cause the source device to pause sending the streaming data;
after sending the first message, receiving, during the inactive portion of the synchronization interval, sensor data from at least one of the one or more other devices; and
at a beginning of a next synchronization interval, sending a second message to the source device to cause the source device to resume sending the streaming data.

2. The method of claim 1, further comprising:
storing at least a portion of the streaming data in the buffer.

3. The method of claim 2, further comprising in response to the level of the buffer being below a second threshold, sending the second message to the source device to cause the source device to resume sending the streaming data, the second threshold lower than the first threshold.

4. The method of claim 3, further comprising sending the first message comprising a zero length packet, the zero length packet comprising a flow indicator having a first value to indicate a stop request to cause the source device to pause sending the streaming data.

5. The method of claim 4, further comprising sending the second message comprising a second zero length packet, the second zero length packet comprising a flow indicator having a second value to indicate a start request to cause the source device to resume sending the streaming data.

6. The method of claim 1, further comprising:
receiving the sensor data from the at least one of the one or more other devices comprising at least one sensor coupled to the sink device via the first wireless protocol.

7. The method of claim 3, further comprising monitoring the level of the buffer via an advanced audio distribution profile (A2DP) state machine associated with the buffer.

8. The method of claim 7, further comprising generating the first message in the A2DP state machine, the message comprising a Bluetooth zero length packet having a flow indicator with a first value comprising a stop request.

9. The method of claim 1, further comprising communicating with at least one sensor via a Bluetooth channel concurrently with receiving the streaming data from the source device via the Bluetooth channel.

10. The method of claim 9, further comprising:

determining if connection data for the at least one sensor is present; and in response to the connection data being present, communicating with the at least one sensor.

11. The method of claim 10, further comprising:

in response to the level of the buffer being below a second threshold, the second threshold lower than the first threshold, halting communicating with the at least one sensor; and sending the second message to the source device to cause the source device to resume sending the streaming data.

12. The method of claim 1, further comprising receiving the streaming data in the sink device as a plurality of portions, wherein the plurality of portions comprises at least some original transmissions and at least one retransmission, the at least one retransmission less than approximately 10% of the at least some original transmissions.

13. An apparatus comprising:

a multi-protocol wireless transceiver to transmit and receive radio frequency (RF) signals of at least a first wireless protocol and a second wireless protocol;

a memory to store a buffer, the buffer to store an audio stream from a source device; and a processor coupled to the memory, the processor comprising an advanced audio distribution profile (A2DP) circuit to monitor a level of the buffer and to initiate a stop request when the level of buffer exceeds a first threshold, the processor to cause the multi-protocol wireless transceiver to send to the source device a first RF signal of the first wireless protocol comprising a zero length packet comprising the stop request and thereafter to stop listening to the source device for at least a remainder of a synchronization interval, during the remainder of the synchronization interval, determine whether a sensor has data to send, and if so, cause the multi-protocol wireless transceiver to receive and process second RF signals comprising the data from the sensor for at least the remainder of the synchronization interval, the synchronization interval based at least in part on profile information associated with the audio stream.

14. The apparatus of claim 13, wherein the synchronization interval is based at least in part on profile information associated with the audio stream.

15. The apparatus of claim 13, wherein the processor, after the remainder of the synchronization interval and when the level of the buffer is below a second threshold lower than the first threshold, is to send to the multi-protocol wireless transceiver a second zero length packet comprising a start request, the multi-protocol wireless transceiver to send to the source device a second RF signal of the first wireless protocol comprising the start request to cause the source device to send at least one more portions of the audio stream.

16. A device comprising:

at least one antenna to transmit and receive radio frequency (RF) signals of a plurality of protocols;

at least one sensor;

at least one transceiver to process and communicate the RF signals of the plurality of protocols via the at least one antenna;

a memory to store a buffer, the buffer to store streaming data from a source device; and a processor coupled to the memory to monitor a level of the buffer and to determine a synchronization interval for communication of the streaming data based at least in part on a size of the buffer and profile information associated with the streaming data, the processor, when a level of the buffer exceeds a first threshold, to generate a first zero length packet comprising a header including a flow indicator having a first value to indicate a stop request to cause the source device to pause the communication of the streaming data, after the at least one transceiver sends the first zero length packet, receive, during an inactive portion of the synchronization interval, sensor data from at least one sensor, and at a beginning of a next synchronization interval, generate a second zero length packet comprising a header indicator including a flow indicator having a second value to indicate a start request to cause the source device to resume sending the streaming data.

17. The device of claim 16, wherein the device comprises a smartwatch, the at least one sensor comprising one or more of a GPS sensor, an accelerometer, and a heart rate sensor.

18. The device of claim 16, wherein the at least one transceiver is to send a first RF signal of a first protocol of the plurality of protocols to the source device, the first RF signal comprising the first zero length packet.

19. The device of claim 18, wherein after the first RF signal of the first protocol is sent, the processor is to cause the at least one transceiver to communicate with the at least one sensor.

* * * * *